May 3, 1949.  S. W. BRIGGS  2,468,862
FLUID FILTERING ELEMENT
Filed Oct. 22, 1943
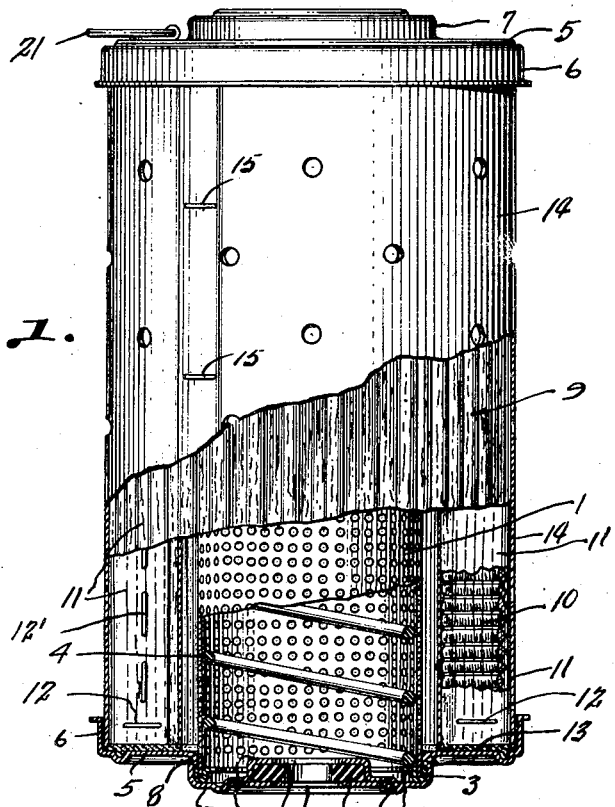
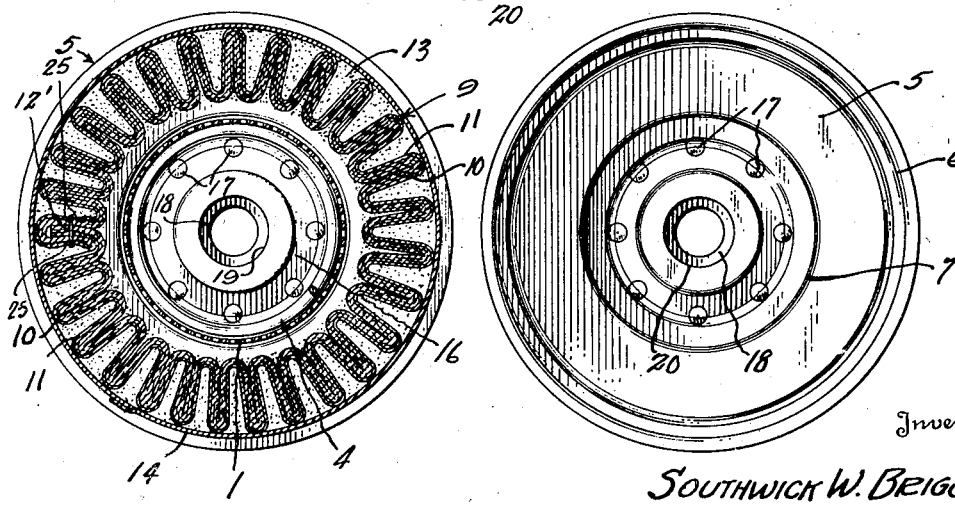
Inventor
SOUTHWICK W. BRIGGS
By Semmes, Keegin, Beale & Semmes
Attorneys Patented May 3, 1949

2,468,862

UNITED STATES PATENT OFFICE 2,468,862

FLUID FILTERING ELEMENT

Southwick W. Briggs, Washington, D. C.

Application October 22, 1943, Serial No. 507,291

7 Claims. (Cl. 210—169)

This invention relates to filtering elements and more particularly to a replaceable filtering cartridge to be used in a liquid clarifying apparatus.

A material known as cellulose wadding for separating suspended solids from liquids has been developed which is particularly adaptable in the clarification of oils. This material, described in my Patent No. 2,092,548, issued September 7, 1937, is fabricated by superimposing a plurality of thin gauze-like webs of loosely interlaced cellulose fibers and then passing the multi-ply sheet between corrugated pressure rolls which emboss both surfaces with parallel ribs of relatively loosely compacted fibers separated by valleys of more tightly compacted fibers. The liquid flows freely through the cellulose wadding but solids suspended in fluid passing through the wadding are entrapped by the interlaced fibers of the several webs making up the wadding.

The amount of separation for a single thickness of the wadding is, however, somewhat limited. As an example, a single thickness of wadding will separate solid material from the fluid down to particles having a size of approximately 25 microns. When the wadding is used in multi-ply filtering elements, a finer degree of separation may be effected; for instance, it has been observed that two sheets of the wadding will separate solids of 16 microns. If it is desired to remove the material down to as small as 3 microns, however, four or more of the cellulose sheets must be used in the filtering wall.

A filtering element employing cellulose wadding as a filtering material has also been developed in which the cellulose wadding is folded accordion fashion and the folded stack then bent into the form of a tube with the folds extending longitudinally of the tube. This forms a tubular filtering wall having a maximum surface area for the size unit. This type of construction is only feasible when using one or two sheets of the wadding to form the wall as folding becomes difficult and the pleated tubular filtering element becomes too bulky if more plies of the material are used. For this reason such unit, while very efficient in providing a maximum filtering area, is, as above set forth, limited to the degree of filtration which it can accomplish.

In the filtration of fluids for certain purposes, it is highly desirable that solids down to as low as 3 microns in size be separated from the fluid. There are certain types of filter paper which will remove solids of this size from fluids. However, these papers are relatively thin sheets and are not self-supporting even when formed into accordion folded walls as in the case of the cellulose wadding unit described above. I have discovered that filter paper may be used in combination with cellulose wadding which will effect a very fine degree of separation of solids and provide a substantially self-supporting filter unit which retains the advantages of cellulose wadding material.

It is, therefore, one of the purposes of this invention to provide a filtering material composed of superposed sheets of cellulose wadding and filter paper.

Yet another object of the invention is to provide a tubular filter element of the above character which is supported on a rigid foraminous cylindrical core member between end plates which are attached to the core.

A still further object is to provide a novel means for assembling the several parts comprising a filter unit of this type into a rigid self-supporting unit which may be easily assembled in a clarifier.

A further object is to provide a filter unit which will remove solids down to approximately 3 microns in size but is simple and inexpensive to manufacture, easy to insert and remove in a clarifier and which will withstand the operating pressures imposed on it during use.

It is also an object of this invention to provide a filter in a supporting container for a filter adapted to be readily slid into place on the discharge tube of a filter casing and having a sealing means engaging the tube. With these and other objects in view, which may be incident to my improvements, the invention consists in the parts and combinations to be hereinafter set forth and claimed with the understanding that the several necessary elements comprising my invention may be varied in construction, proportions and arrangements, without departing from the spirit and scope of the appended claims.

In order to make my invention more clearly understood, I have shown in the accompanying drawings means for carrying the same into practical effect without limiting the improvements in their useful applications to the particular constructions which, for the purpose of explanation, have been made the subject of illustration.

In the drawings:

Figure 1 is an elevational view, parts being broken away to show the construction of a replaceable filtering element made in accordance with this invention.

Figure 2 is a horizontal cross sectional view of the unit shown in Figure 1.

Figure 3 is a bottom plan view of the unit shown in Figure 1.

Generally the filtering element comprises a replaceable filtering cartridge to be used in oil clarifying apparatus and consists essentially of an inner cylindrical core made of foraminous sheet metal about which is positioned a tubular wall composed of an accordion folded two-ply sheet of filtering material, one ply of which is cellulose wadding and the other ply, filter paper. The ends of this tubular filter wall are cemented to the inner surface of end plates which are respectively attached to the opposite ends of the inner core. Each of the end plates is provided with a central aperture adjacent which is secured a resilient gasket of suitable oil resisting material. About the filtering wall and engaging the end plates is a cylindrical covering made preferably from a foraminous sheet of fairly stiff paper to protect the filter wall against damage. The cartridge is adapted for use in the type of clarifier which has a reservoir for the reception of oil to be filtered and a discharge tube extending into the reservoir and is assembled in the reservoir about the discharge tube, the resilient gaskets above referred to closely engaging the discharge tube.

In the filtering process, oil containing solids in suspension is admitted to the reservoir of the clarifier and flows through the outer foraminous covering radially inward of the filter cartridge through the filter material into the center core, where it then passes into the discharge tube and thence out of the clarifier. During its passage through the filter wall, solids contained in the oil are removed. The cellulose wadding serves as a support or backing for the filter paper permitting fluid pressures to be employed in the filtering process which would otherwise burst the paper sheet. In addition, the cellulose wadding acts as a filtering medium.

Describing a preferred form of unit as shown in the drawings, the numeral 1 represents an inner core in the form of a foraminous metal cylinder. Adjacent each end of the core is a ring 2 secured to the end of the core by rolling the periphery of the ring about the end of the core which provides a peripheral bead 3. This ring serves as a flange to strengthen the end of the core against radial distortion. If desired, the cylindrical wall of the core member 1 may be additionally supported by means of a stiff helically wound wire element 4 inserted in the core, the periphery of the helix closely engaging the inner cylindrical surface of the core. Obviously, other forms of core construction may be substituted for that shown in the drawings and described.

Each end of the core 1 carries an end plate 5 which extends radially beyond the periphery of the core and has its peripheral edge cupped as indicated at 6. The end plates 5 are provided with a central depression or well 7 into which the end of the core member 1 fits and is secured by spinning the cylindrical wall of the depression about the bead 3 as shown at 8.

Surrounding the core 1 and extending between the end plates 5 is the filter wall, which is designated generally as 9, and is composed of superposed sheets of filtering material, one of which is a sheet of cellulose wadding 10 and the other a sheet of filter paper 11. In making the filter wall, a strip of the cellulose wadding with the ribs running longitudinally is placed in juxtaposition with a sheet of filter paper of similar dimensions and the two sheets are then folded together accordion fashion. This forms a plurality of stretches of material extending between the folds. The ends of pairs of adjacent stretches are next secured together by suitable means such as staples 12. The thus folded stack is then bent into a tubular formation with the filter paper on the side that will be outwardly disposed when the tube is mounted upon the core. The free ends of the folded member are secured together in tubular form, by suitable means such as staples 12', and the filter paper may overlap the free ends a sufficient distance to effectively seal the junction of the free ends as indicated by the numeral 5.

This assembly of the filtering material causes the strips of material between the folds to fan out somewhat and extend substantially radially of the tube with the folds extending longitudinally of the wall, alternate folds of the material lying respectively adjacent the inner and outer peripheries of the tube. Preferably the stack is compressed sufficiently so that when it is bent into its tubular formation there will be a slight space between adjacent folds defining the outer periphery of the tube.

The ends of the tubular filter wall are secured to the inner surfaces of the end plates 5 by means of a suitable plastic adhesive material, such as a cement 13 having a shellac base, which likewise effectively seals the ends of the open spaces between the adjacent strips of material.

Surrounding the tubular wall of filtering material 9 is a cover tube 14 made preferably by rolling a sheet of foraminous rather stiff paper into the form of a cylinder and securing the ends thereof by means of staples 15. This cover tube is positioned between the end plates 5 and is held in place by means of cupped edges 6 of the end plates.

Fitted within the well portions 7 of each of the end plates 5 is a dished plate 16 which is secured to the inner surface of the well, preferably by means of spot welding as shown at 17, and between the dished plate 16 and the bottom of the well 7 is positioned a resilient annular gasket 18. This gasket is preferably made of synthetic rubber or other oil resistant material and is compressed between the dished plate and the bottom of the well 7. The dished plate 16 and the well 7 are provided with aligned central apertures 19 and 20, respectively, of a slightly larger diameter than the inner diameter of the gasket 18.

In assembling the unit thus described, the tubular and folded filter element 9 is placed about the core 1 and the outer covering 14 is placed about the filter element. The interior surfaces of the end plates 5 are then coated with the above-mentioned cementitious material 13 and placed over the ends of the inner core 1 with ends of the core fitted within the wells 7. The annular walls of the well 7 are then spun about the bead 3 formed on the ends of the core thereby securely fixing the end plates to the inner core. When assembled, the ends of the tubular filter wall will be embedded in the cement 13 which, after it hardens, seals the ends of the filter wall to the end plates.

If desired, a finger engaging ring such as shown at 21 may be attached to one of the end plates 5 to facilitate insertion and removal of the filter cartridge from the clarifier in which it is used.

In fabricating the two-ply filter wall 9 for use in separating solids from liquids, under the majority of conditions I prefer that the filter paper be positioned adjacent the outer surface of the cellulose wadding and form the outside of the composite wall. For filtering certain types of material and carrying out the filtering process under certain conditions, however, it may be desirable that the cellulose wadding material be on the outside of the filter wall and the filter paper on the inner surface.

The unit made according to this invention is compact, will effect an extremely fine degree of filtration and is sufficiently rigid to withstand the substantial fluid pressures to which it may be subjected in the filtering operations. It offers a maximum filtering area for the size of the unit and is easily replaceable in a clarifying apparatus when it becomes clogged or contaminated through long use.

While I have shown and described the preferred embodiment of my invention, I wish it to be understood that I do not confine myself to the precise details of construction herein set forth by way of illustration, as it is apparent that many changes and variations may be made therein, by those skilled in the art, without departing from the spirit of the invention, or exceeding the scope of the appended claims.

I claim:

1. A filtering unit for assembly in a clarifier having a tube for discharging clarified material comprising a foraminous core adapted to be positioned in the clarifier surrounding the discharge tube, a circular end plate concentrically secured to each end of the core and extending radially beyond the periphery thereof, each of said end plates having a central aperture therein, a dished plate attached to the inner surface of each of the end plates, each of the dished plates having a central aperture registering with the aperture in the end plate to which said dished plate is attached, a resilient annular member having an inner diameter less than the diameter of said apertures positioned between each of said end plates and dished plates for engaging said discharge tube, and a tubular filtering body surrounding the core and having its opposite ends secured to said end plates, said filtering body being composed of an inner layer of cellulose wadding and an outer layer of filter paper.

2. A filtering unit for assembly in a clarifier having a tube for discharging clarified material comprising a foraminous core adapted to be positioned in the clarifier surrounding the discharge tube, a circular end plate concentrically secured to each end of the core and extending radially beyond the periphery thereof, each of said end plates having a central aperture therein, a dished plate attached to the inner surface of each of the end plates, each of the dished plates having a central aperture registering with the aperture in the end plate to which said dished plate is attached, a resilient annular member having an inner diameter less than the diameter of said apertures positioned between each of said end plates and dished plates for engaging said discharge tube, and a tubular filtering body surrounding the core and having its opposite ends secured to said end plates.

3. A filtering unit for assembly in a clarifier having a tube for discharging clarified material comprising a foraminous core adapted to be positioned in the clarifier surrounding the discharge tube, a circular end plate concentrically secured to each end of the core and extending radially beyond the periphery thereof, each of said end plates having a central aperture therein, a dished plate attached to a surface of each of the end plates, each of the dished plates having a central aperture registering with the aperture in the end plate to which said dished plate is attached, a resilient annular member having an inner diameter less than the diameter of said apertures positioned between each of said end plates and dished plates for engaging said discharge tube, and a tubular filtering body surrounding the core and having its opposite ends secured to said end plates.

4. A filtering unit for assembly in a clarifier having a tube for discharging clarified material comprising a foraminous core adapted to be positioned in the clarifier surrounding the discharge tube, a circular end plate concentrically secured to each end of the core and extending radially beyond the periphery thereof, each of said end plates having a central aperture therein, a second apertured plate attached to a surface of each of the end plates and having the aperture in alignment with the aperture of the end plate, said second apertured plates being spaced from the end plates at the aperture, a resilient annular member having an inner diameter less than the diameter of said apertures positioned between each of said end plates and second apertured plates for engaging said discharge tube, and a tubular filtering body surrounding the core and having its opposite ends secured to said end plates.

5. A filtering unit for assembly in a clarifier having a tube for discharging clarified material comprising a foraminous core adapted to be positioned in the clarifier surrounding the discharge tube, a circular end plate concentrically engaging each end of the core and extending radially beyond the periphery thereof, each of said end plates having a central aperture therein, a second apertured plate attached to a surface of each of the end plates and having the aperture in alignment with the aperture of the end plate, said second apertured plates being spaced from the end plates at the aperture, a resilient annular member having an inner diameter less than the diameter of said apertures positioned between each of said end plates and second apertured plates for engaging said discharge tube, and a tubular filtering body surrounding the core and having its opposite ends secured to said end plates.

6. A filtering unit for assembly in a clarifier having a tube for discharging clarified material comprising a foraminous core adapted to be positioned in the clarifier surrounding the discharge tube, an end plate concentrically engaging each end of the core and extending radially beyond the periphery thereof, each of said end plates having a central aperture therein, a second apertured plate engaging a surface of each of the end plates and having the aperture in alignment with the aperture of the end plate, said second apertured plates being spaced from the end plates at the aperture, a resilient annular member having an inner diameter less than the diameter of said apertures positioned between each of said end plates and second apertured plates for engaging said discharge tube, and a tubular filtering body surrounding the core and engaging the end plates whereby the fluid being filtered passes substantially radially through the filtering unit.

7. A filtering unit for assembly in a clarifier having a tube for discharging clarified material comprising a foraminous core adapted to be positioned in the clarifier surrounding the discharge tube, an end plate concentrically engaging each end of the core and extending radially beyond the periphery thereof, each of said end plates having a central aperture therein, a second apertured plate secured to a surface of each of the end plates and having the aperture in alignment with the aperture of the end plate, said second apertured plates being spaced from the end plates at the aperture, a resilient annular member having an inner diameter less than the diameter of said apertures positioned between each of said end plates and second apertured plates for engaging said discharge tube, said end plates being cupped at their outer edge to engage a foraminous cover tube, and a tubular filter body surrounding the core and enclosed by the cover tube, said filter body engaging the end plates whereby the fluid being filtered passes substantially radially through the filter unit.

SOUTHWICK W. BRIGGS.

REFERENCES CITED

The following references are of record in the file of this patent:

UNITED STATES PATENTS

| Number | Name | Date |
|---|---|---|
| 336,799 | Derham | Feb. 23, 1886 |
| 754,053 | Derham | Mar. 8, 1904 |
| 817,253 | Kneuper | Apr. 10, 1906 |
| 1,937,415 | Sidney | Nov. 28, 1933 |
| 1,940,316 | McKinley | Dec. 19, 1933 |
| 2,079,910 | Kamrath | May 11, 1937 |
| 2,092,548 | Briggs | Sept. 7, 1937 |
| 2,101,811 | Franzmeier | Dec. 7, 1937 |
| 2,134,601 | Campbell | Oct. 25, 1938 |
| 2,196,821 | Arnold | Apr. 9, 1940 |
| 2,197,471 | Hooper | Apr. 16, 1940 |
| 2,203,495 | Kamrath | June 4, 1940 |
| 2,209,180 | Von Pentz | July 23, 1940 |
| 2,218,800 | Williams | Oct. 22, 1940 |
| 2,239,868 | Williams | Apr. 29, 1941 |
| 2,279,423 | Vokes | Apr. 14, 1942 |
| 2,287,344 | Easton et al. | June 23, 1942 |
| 2,305,654 | Wilkinson | Dec. 22, 1942 |
| 2,321,985 | Briggs | June 15, 1943 |
| 2,347,384 | Winslow et al. | Apr. 25, 1944 |
| 2,349,469 | Sloan | May 23, 1944 |